Nov. 6, 1962  A. W. RICHARDSON  3,063,010
MICROWAVE DOSIMETER
Filed April 25, 1960  2 Sheets-Sheet 1

INVENTOR.
ALFRED W. RICHARDSON
BY *John Shogo*
ATTORNEY

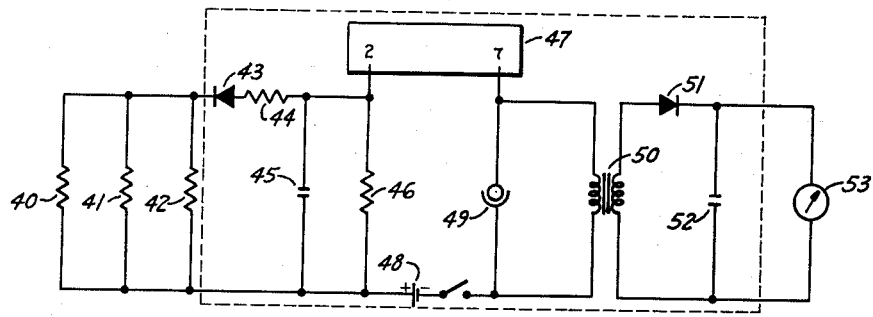
FIG. 5
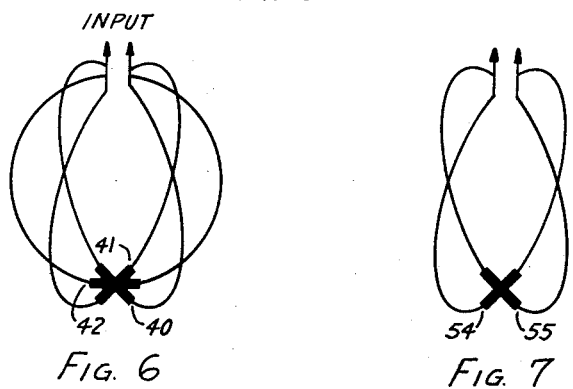
FIG. 6
FIG. 7
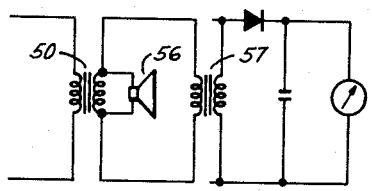
FIG. 8

United States Patent Office 3,063,010
Patented Nov. 6, 1962

3,063,010
MICROWAVE DOSIMETER
Alfred W. Richardson, St. Louis, Mo., assignor, by mesne assignments, to the United States of America as represented by the Secretary of the Navy
Filed Apr. 25, 1960, Ser. No. 24,627
8 Claims. (Cl. 325—364)

The present invention relates generally to apparatus for monitoring the intensity of electromagnetic radiation and, more particularly, to a miniaturized dosimeter for providing either a visual or auditory indication of the amount of thermal energy developed within the human body as a consequence of its irradiation by electromagnetic energy.

In long range radar, navigation and object guidance systems where high levels of microwave or radio frequency energy are propagated into space, personnel working in the vicinity of the antenna structure must be safeguarded against excessive exposure to the high intensity electromagentic fields existing within and near the radiated beams. Unlike high-speed charged atomic and subatomic particles, electromagnetic energy causes biological damage by raising the temperature of human tissue and organs to intolerable levels. Conventional field strength meters and similar devices cannot monitor this thermogenic action with any degree of precision primarily because their pickup components do not respond to radiant electromagnetic energy in the same manner as the human body. Furthermore, the size of these detectors, their frequency sensitivity and directional characteristics are additional factors which effectively preclude their utilization as personnel monitoring devices.

Also, in order to ascertain whether a particular exposure is approaching the maximum safe dosage, it is necessary to take into account not only the intensity of the electromagnetic field but also the period during which the individual has been exposed to it. This means, in effect that the monitoring device should function on a cumulative basis. This mode of operaton cannot be realized with most field strength meters since these instruments in their usual form measure only the instantaneous magnitude of the field within which they are disposed.

It is accordingly a primary object of the present invention to provide a dosimeter for monitoring the heat energy developed within the human body as a consequence of its exposure to an electromagnetic field.

Another object of the present invention is to provide a dosimeter for electromagnetic energy which is an analogue of the human body.

A still further object of the present invention is to provide a dosimeter for safeguarding personnel working in high intensity electromagnetic fields from overexposure.

A still further object of the present invention is to provide a device which is capable of monitoring the thermogenic action of microwave or RF energy in either pulsed or continuous wave form.

A still further object of the present invention is to provide an arrangement for indicating the heat level produced in the human body as a result of its exposure to an electromagnetic field of constant or variable intensity.

A still further object of the present invention is to provide a miniaturized dosimeter sensitive to electromagnetic energy which can be corrected for ambient temperature variations.

A still further object of the present invention is to provide a transistorized dosimeter for measuring on an instantaneous or accumulative basis the thermogenic response of a human body to an electromagnetic field.

A still further object of the present invention is to provide a transistorized dosimeter for personnel monitoring purposes which has relatively omnidirectional characteristics for use with electromagnetic fields.

Other objects and many of the attendant advantages of this invention will be readily appreciated as the same becomes better understood by reference to the following detailed description when considered in connection with the accompanying drawings wherein:

FIG. 5 is a schematic circuit capable of providing both an auditory and visual indication of the intensity of a pulsed electromagnetic field of the type encountered in radar search systems;

FIG. 6 schematically illustrates the input device of FIG. 5;

FIG. 7 illustrates an alternative input construction; and

FIG. 8 shows a variation of the output circuit for FIG. 5 for providing an additional audible indication of the intensity of the electromagnetic field.

Figure 1:
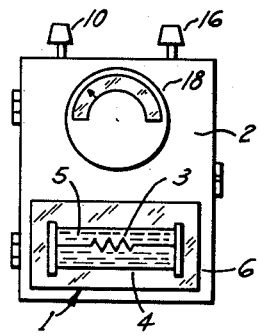
FIG. 1 illustrates the appearance of a portable dosimeter for monitoring continuous or pulsed electromagnetic fields.

Referring now to FIG. 1, which illustrates the appearance of a cumulative type dosimeter constructed according to the present invention, the electromagnetic energy pickup component of this instrument, generally represented by reference character 1, is housed within a hinged, metallic container 2 having the size of a cigarette package. In order to reproduce the thermal response of the human body to electromagnetic energy, this pickup element or detector is fabricated in the form of a thermistor 3 encapsuled within a dielectric container 4 filled with a nonhydroscopic, electrolytic gelatin 5, such as, for example, Thiogel. It has been found that such a gel behaves as an analogue of human and animal tissue with respect to the thermogenic action of microwave and radio frequency energy.

Container 2 is provided with suitable front and rear windows 6 made of a dielectric material transparent to electromagnetic energy. This design permits the capsule to be illuminated with energy coming from any direction but end on. Also housed within container 2, but shielded from the effects of the electromagnetic energy, is a temperature reference pickup element 7, not shown in this figure but having the same structure as element 1.

Figure 2:
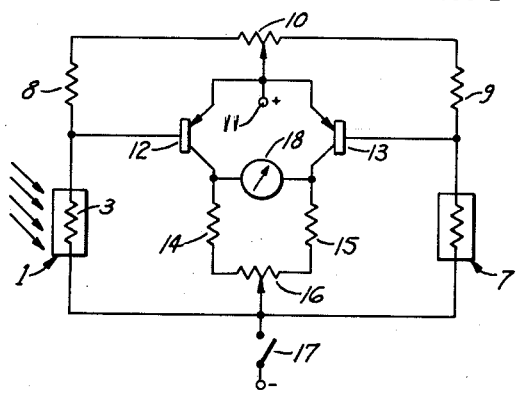
FIG. 2 is a circuit diagram of the apparatus of FIG. 1.

As best shown in FIG. 2, the thermistors of both pickup elements are connected in opposite arms of a first bridge, the other components of which are equal resistors 8 and 9, potentiometer 10 and D.C. voltage source 11. A pair of junction transistors 12 and 13 in a second bridge with equal resistors 14 and 15 and potentiometer 16 cooperate with this first bridge to increase the over-all sensitivity of the system. The bases of both transistors are connected to the midpoints of opposite arms of the first bridge. The emitters are tied to the positive terminal of the D.C. voltage source and the collectors are connected via resistors 14 and 15 to opposite sides of potentiometer 16, the movable contact of which is connected directly to one side of each pickup element and then by a single pole switch to the negative terminal of the voltage source. The indicating device, current meter 18, is connected across both collectors. All of the components of this circuit with the exception of pickup element 1 and the dial of meter 18 are shielded from the effects of the illuminating electromagnetic radiation.

The operation of this circuit is as follows. Initially, that is, with no electromagnetic energy illuminating pickup element 1, the first bridge is in a state of balance since both thermistors introduce equal amounts of resistance into their associated arms. Equal bias potentials are therefore present at the bases of transistors 12 and 13. Since duplicate potential levels exist also at both emitters and collectors, the second bridge 2 is likewise in a state of balance with meter 18 indicating a null condition. It would be mentioned at this time that for purposes of description it has been assumed that the movable contacts of potentiometers 10 and 16 occupy their midpositions, a condition that insures the electrical symmetry of both bridges.

When electromagnetic radiation illuminates pickup element 1, the first bridge becomes unbalanced because of the change in magnitude of the resistance of thermistor 3, which component, as is well known, has a negative temperature coefficient. The direction of this unbalance is such that the base of transistor 12 moves in a negative direction. This movement decreases the emitter-to-collector impedance of transistor 12 and causes the second bridge to become unbalanced. It will be appreciated that this last degree of unbalance is effectively amplified over that experienced by the first bridge because of the performance of transistor 12. Since the gelatin surrounding thermistor 3 functions for short periods of time as a heat storage device, the capsule accumulates the electromagnetic effect and thereby permits meter 18 to respond in a cumulative fashion to the intensity of the irradiating energy.

Potentiometer 10 is included in the first bridge to compensate for the difference in behavior of pickup element 1 and temperature reference element 7 to ambient temperature changes. In other words, because different temperature conditions can exist at the two thermistors as a result of their different locations and shielding, some provision preferably should be included in the circuit for balancing out this possible error. As regards the inclusion of potentiometer 16 in the second bridge, while this component is not essential to the operation of the circuit, its presence is desirable since it serves to zero meter 18 whenever the parameters of the second bridge circuit change. Hence, the setting of the movable contact of this potentiometer takes care of shifts in the operating characteristics of the transistors brought about by aging and also fluctuations in the magnitude of the D.C. voltage source. For maximum precision and sensitivity, transistors 12 and 13 and thermistors 1 and 7 should be matched and a microammeter should be employed as the current indicating device. It will be readily apparent that container 2 can be constructed entirely of dielectric material to simplify the problem of providing the necessary window for the irradiating electromagnetic energy. With such a design, of course, the shielding would be accomplished with suitable metallic sheeting or the like.

Figure 3:
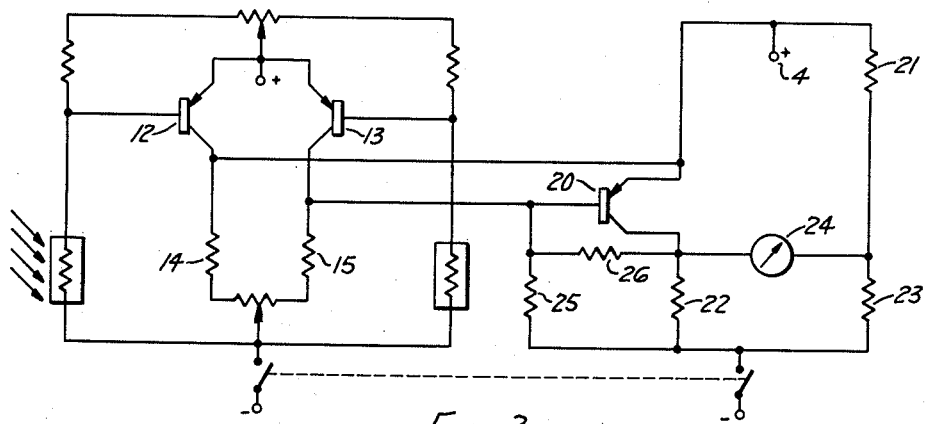
FIG. 3 is an alternative circuit which can be employed for increased sensitivity and stability.

FIG. 3 illustrates an arrangement wherein a third bridge is coupled to the system of FIG. 2 for realizing higher gain and greater sensitivity. In this arrangement, junction transistor 20, resistor 21, equal resistors 22 and 23 and voltage source 4 form a third bridge which is interlocked with the second bridge made up of transistors 12 and 13 and resistors 14 and 15. From an inspection of this figure, it will be seen that when the emitter-to-collector impedance of transistor 12 drops as a consequence of the irradiation of the pickup element 1, the increased current flow through resistor 14 causes a higher positive voltage to appear at the emitter of transistor 20. As a result, an increased current flows through resistor 22 and the third bridge becomes unbalanced. Meter 24 once again gives a reading indicative of the level of the electromagnetic energy illuminating the pickup element.

It will be pointed out in connection with this figure that potentiometer 16 not only balances the second bridge but also the third bridge for zero correction to the current indicator 24. Resistors 25 and 26 provide biasing and negative feedback for transistor 20. The negative feedback feature, of course, gives the circuit a more linear response, a characteristic which may be desirable in telemetering applications.

It would also be mentioned that when the second bridge is in balance there is no forcing potential existing in the system and, consequently, no load on the third bridge. If extreme stability is desired, resistor 21 can be replaced with a junction transistor duplicating the performance of transistor 13 in the second bridge.

Figure 4:
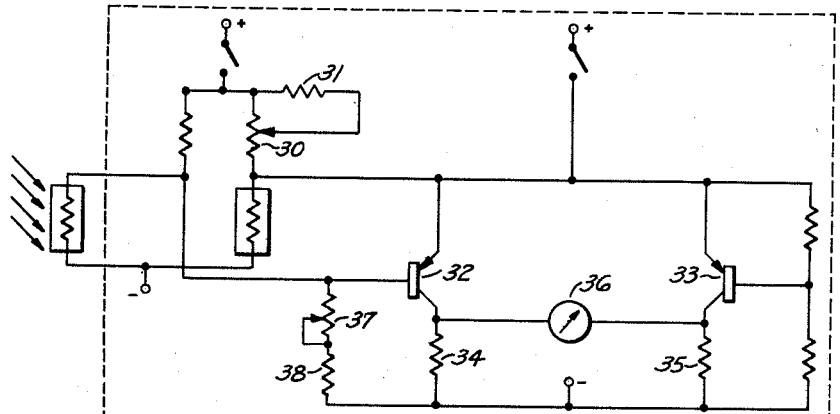
FIG. 4 is a diagram of an alternative circuit for the monitoring apparatus.

In FIG. 4, there is shown a circuit diagram of a dosimeter responsive to continuous or pulsed energy where the ambient temperature compensation is in a first bridge along with the sensing element but where secondary temperature compensation is accomplished in a second bridge. Here, a resistance network, consisting of components 30 and 31, is included in the reference arm of the first bridge and, by changing the effective resistance of this network, disturbances brought about by ambient temperature variations can be balanced out. The second bridge consists of transistors 32 and 33 and equal resistors 34 and 35; the current indicating device 36 being connected across the connectors of these transistors. Temperature compensations required by the heating of the amplifier circuit are achieved by changing the bias on the base of transistor 32. This is done by simply changing the position of the movable contact of a rheostat 37 connected in a series relationship with a fixed resistor 38 between the base of this transistor and the negative terminal of a voltage source 37 energizing the second bridge.

From an inspection of FIG. 4, it will be readily seen that the base of transistor 32 moves in a negative direction when radiant energy illuminates the pickup element and that this movement is accompanied by an increased current flow through resistor 34 in its collector circuit. This results in a condition of bridge unbalance, with meter 36 again indicating the intensity of the irradiating electromagnetic field. This circuit offers the advantage of low input impedance, high stability and high sensitivity but requires the presence of an extra voltage source. Its sensitivity can be further improved by adding on a third bridge according to the teachings of FIG. 3.

In FIG. 5 there is illustrated the schematic diagram of a dosimeter, specially designed for radar, which is responsive to pulsed electromagnetic energy. Here, the pickup apparatus consists of three high ohmage resistors 40, 41 and 42 arranged spatially at equal angle vectors and connected in a parallel electrical relationship. The leads of these resistors are bent to form a sphere, the resulting configuration of loops thereby formed allowing sensitive detection over substantially 360° in any plane except for blind spots where the output cable connected to the extremities of these leads enters a shield arrangement. The manner in which these resistors cooperate is shown in FIG. 6. It will be seen from an examination of this figure that the bodies of the three resistors 40, 41 and 42 are superimposed symmetrically one on top of the other with their longitudinal axes approximately sixty degrees apart and that the leads are curved to form approximately a spherical shape with corresponding ends thereof tied together to serve as the input circuit for the detector. An alternative construction making use of only two mutually perpendicular resistors 54 and 55 is depicted in FIG. 7. Like its counterpart in FIG. 1, the resistance pickup is housed within a metallic container behind exposure windows made of a material transparent to electromagnetic energy. Upon illumination, a composite voltage signal having microwave and pulse characteristics appears in the input of a detecting diode 43. It will be appreciated that the amplitude of the input signal corresponds to the voltage developed across that particular resistor of the group whose loop is best orientated with respect to the direction of the impinging electromagnetic energy. Connected to the output of this diode is a resistance-capacitance time constant circuit made up of series resistor 44 and shunt capacitor 45 and resistor 46. This RC circuit erases the carrier signal and passes a pulse wave to the input of an amplifier represented schematically by rectangular box 47. In this connection, it would be pointed out that the RC circuit integrates the highly peaked square wave and transforms it into a modified saw-tooth wave having less height but more width than the original square wave. The rise time of the saw-tooth wave is determined by the conjoint action of resistor 44 and capacitor 45, the decay time by resistor 46 and capacitor 45. An earphone 49 is connected across the output transformer 50 and permits auditory monitoring of the intensity of the irradiating electromagnetic energy. A diode 51 is connected in the secondary circuit of transformer 50 for rectification and a cooperating shunt capacitor 52 permits the field detection to be recorded on a D.C. microammeter 53. Thus, the radar pulse originally picked up is converted to an auditory and visual stimulus to the ear and eye of the individual wearing or otherwise carrying the dosimeter. As an added convenience, the output circuit of FIG. 5 can be modified, as shown in FIG. 8, to include a loudspeaker assembly 54. To permit the incorporation of such a device, an additional transformer 57 is included in the system.

It will be appreciated that the input device of the system of FIG. 5 can take the form of three complementary diodes instead of the three resistors above described and that a wide variety of well known semiconductors may be used to carry out the detecting function performed by diode 43.

Obviously many modifications and variations of the present invention are possible in the light of the above teachings. It is therefore to be understood that within the scope of the appended claims the invention may be practiced otherwise than as specifically described.

What is claimed is:

1. In a dosimeter for measuring the thermogenic effect of electromagnetic radiation, a dielectric container, a nonhydroscopic electrolytic gelatin enclosed therein and a thermistor embedded in said gelatin, the change in the resistance of said thermistor being indicative of the thermogenic effect of the electromagnetic radiation illuminating said dielectric container.

2. An analog device for providing an indication of the thermogenic response of human and animal tissues to electromagnetic radiation, said analogue comprising a dielectric member exposed to said radiation, an electrolytic gelatin enclosed by said member, a thermistor embedded in said gelatin and means for measuring the magnitude of the change in resistance of said thermistor when said dielectric member is illuminated with electromagnetic radiation.

3. A pickup device for a dosimeter which measures exposure to electromagnetic energy, said pickup device comprising a capsule made of a material transparent to electromagnetic energy, an electrolytic gelatin stored within said capsule, a thermistor embedded in said gelatin, and a resistance bridge circuit for measuring the variations in resistance of said thermistor when said capsule is exposed to an electromagnetic energy, said bridge circuit containing as one component thereof said thermistor.

4. A dosimeter for monitoring the thermogenic effect of electromagnetic energy comprising, in combination, first and second thermistors of equal resistance, each thermistor being embedded in an electrolytic gel, a resistance bridge having said first and second thermistors in corresponding positions in opposite arms thereof, said first thermistor being irradiated by the electromagnetic energy which is being monitored, said second thermistor being shielded from said electromagnetic energy, and means for providing a visual indication of the amount of unbalance of said bridge.

5. A dosimeter for monitoring the exposure of personnel to high intensity electromagnetic radiation comprising, in combination, a first and second detector, each detector consisting of a container made of a material transparent to said electromagnetic radiation, an electrolytic gel enclosed therein and a thermistor embedded in said gel, a first resistance bridge circuit having the thermistors of said first and second detectors in corresponding positions in opposite arms thereof, one of said detectors being exposed to said electromagnetic radiation and the other being shielded from said electromagnetic radiation, a second bridge circuit, said second bridge circuit being connected to the output of said first bridge circuit so as to amplify the amount of unbalance of said first bridge circuit, and means for providing an indication of the amount of unbalance of said second bridge circuit.

6. A dosimeter circuit for electromagnetic radiation comprising, in combination, a first and second thermistor, each thermistor being embedded in an electrolytic gelatin, with said first thermistor being exposed to and said second thermistor being shielded from said electromagnetic radiation, a first and second resistor, said resistors being of equal magnitude, means for connecting said thermistors and said resistors in a first D.C. bridge circuit such that said first and second thermistors occupy corresponding positions in opposite arms thereof, a first and second transistor, a third and fourth resistor, said third and fourth resistors being of equal magnitude, means for connecting said transistors and said third and fourth resistors in a second bridge circuit such that said transistors occupy corresponding positions in opposite arms thereof, said second bridge circuit being energized from the same D.C. source as said first bridge and the emitter-to-collector impedances of said transistors being oppositely changed by the amount of unbalance of said first bridge circuit, and means for indicating the amount of unbalance of said second bridge circuit.

7. A dosimeter circuit for monitoring electromagnetic radiation exposure comprising, in combination, a first and second thermistor, each thermistor being embedded in an electrolytic gel with said first thermistor being unshielded and said second thermistor being shielded from said electromagnetic radiation, a D.C. voltage source, a first and second resistor, said resistors being of equal magnitude, a potentiometer, said first thermistor, said first resistor and one portion of said potentiometer being connected in series across said D.C. voltage source and said second thermistor, said second resistance and the complementary portion of said potentiometer being connected in series across said D.C. voltage source to form a first resistance bridge network with said first and second thermistors occupying corresponding positions in opposite arms of said bridge circuit, a first and second transistor, a third and fourth resistor, said third and fourth resistors being of equal magnitude, a second potentiometer, means for connecting the emitters of both thermistors to the positive terminal of said D.C. voltage source, means for connecting the bases of said first and second transistors to corresponding midpoints of opposite arms of said first bridge circuit between said first thermistor and said first resistor and said second thermistor and said second resistor, respectively, means for connecting said third resistor and one portion of said second potentiometer in a series circuit between the collector of said first transistor and said negative terminal, means for connecting said third resistor and the complementary portion of said second potentiometer in a series circuit between the collector of said second transistor and said negative terminal, whereby a second bridge circuit is formed for amplifying the unbalance of said first bridge circuit and a current indicating device connected across the collectors of said first and second transistors.

8. A circuit for monitoring the thermogenic effect of electromagnetic radiation comprising, in combination, a first and second thermistor, each thermistor being embedded in an electrolytic gel with said first thermistor being exposed to and said second thermistor being shielded from said electromagnetic radiation, a first and second resistor, said resistors being of equal magnitude, a source of D.C. potential, a first and second transistor, a third and fourth resistor, said third and fourth resistors being of equal magnitude, a first and second potentiometer, means for connecting the emitters of both transistors and the movable contacts of the first potentiometer to the positive terminal of said voltage source, means for connecting said first resistor between the base of said first transistor and one side of said first potentiometer, means for connecting said second resistor between the base of said second transistor and the other side of said first potentiometer, means for connecting said first thermistor between the base of said first transistor and the negative side of said voltage source, means for connecting said second thermistor between the base of said second transistor and the negative side of said voltage source, means for connecting the movable contact of said second potentiometer to the negative side of said voltage source, means for connecting said third resistor between the collector of said first transistor and one side of said second potentiometer, means for connecting said fourth resistor between the collector of said second transistor and the other side of said second potentiometer, whereby first and second bridge circuits are formed with said thermistors occupying corresponding positions in opposite arms of said first bridge, and said transistors occupying corresponding positions in opposite arms of said second bridge, and a current indicating device connected across the collectors of said first and second transistors.

References Cited in the file of this patent

UNITED STATES PATENTS

| | | |
|---|---|---|
| 2,596,080 | Raper et al. | May 6, 1952 |
| 2,859,317 | Hersh | Nov. 4, 1958 |